United States Patent [19]

Fitterer et al.

[11] 3,831,882

[45] Aug. 27, 1974

[54] GUIDE MEANS FOR MAGNETIC TAPES WOUND ON FLANGELESS SPOOLS

[76] Inventors: Horst Fitterer, 3 Buehlerstrasse, 6900 Heidelberg-Hasenleiser; Norbert Schaeffer, 21c Berliner Strasse, 6700 Ludwigshafen, both of Germany

[22] Filed: Dec. 12, 1972

[21] Appl. No.: 314,357

[52] U.S. Cl. .................... 242/199, 226/196, 242/76

[51] Int. Cl.... G03b 1/04, G11b 15/32, G11b 23/04

[58] Field of Search ...................... 242/76, 197–200; 274/4 B, 4 C, 11 B, 11 C; 226/97, 196; 352/72, 78; 179/100.2 Z

[56] References Cited

UNITED STATES PATENTS

| | | | |
|---|---|---|---|
| 3,008,661 | 11/1961 | Estes et al. | 242/197 |
| 3,281,040 | 10/1966 | Grant | 242/76 |
| 3,661,345 | 5/1972 | Ritz, Jr. et al. | 242/199 |

FOREIGN PATENTS OR APPLICATIONS

| | | | |
|---|---|---|---|
| 1,046,547 | 12/1953 | France | 242/199 |

*Primary Examiner*—Leonard D. Christian
*Attorney, Agent, or Firm*—Johnston, Keil, Thompson & Shurtleff

[57] ABSTRACT

A guide element for magnetic tapes to be wound in the form of packs on flangeless spools, particularly for tapes in magnetic tape cartridges, which is arranged in a fixed position near the periphery of the pack at maximum pack diameter and provided with a guide surface and guide flanges. Such elements improve guidance of the turn of tape approaching and/or leaving the pack, resulting in a stable and accurate winding on the spool and in undisturbed tape travel.

6 Claims, 7 Drawing Figures

GUIDE MEANS FOR MAGNETIC TAPES WOUND ON FLANGELESS SPOOLS

Figure 1:
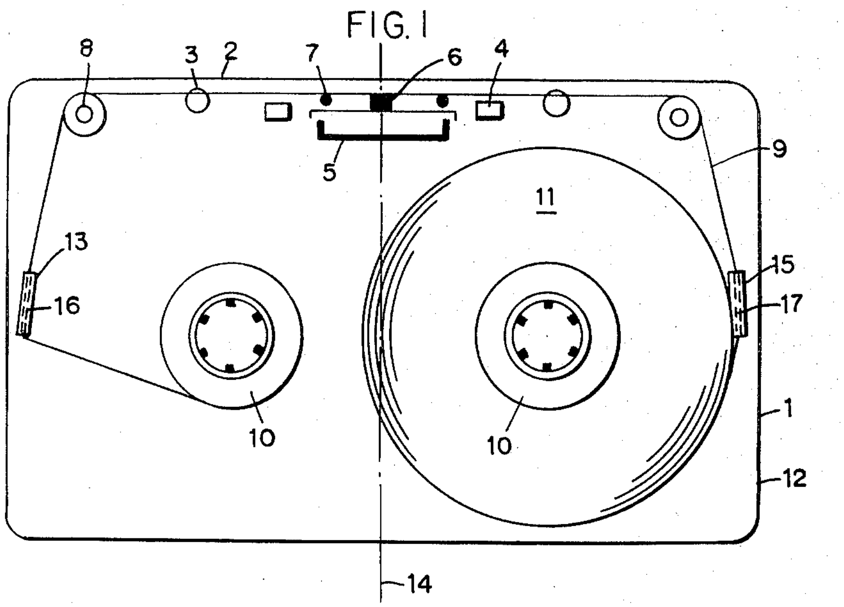

This invention relates to guide means for magnetic tapes to be wound in the form of packs on flangeless spools, particularly for tapes in magnetic tape cartridges, comprising a fixed element arranged perpendicular to the plane of rotation of the packs.

Fixed tape guide pins, etc. for use on studio tape recorders employing flangeless spools are already known. However, these members for guiding the magnetic tape past the magnetic heads are arranged in the vicinity of the latter and are consequently at a relatively large distance from the periphery of the tape packs.

Tape guide pins which are integral with the housing of a magnetic tape cartridge comprising two halves are disclosed in German Petty Pat. No. 1,972,045. These pins are located near the front side wall of the cartridge and serve to guide the magnetic tape in a plane parallel to this wall. These guide pins are also arranged at a relatively large distance from the periphery of the tape packs so that they cannot directly influence the turn of tape approaching the take-up reel. Moreover, these fixed pins have the disadvantage that, as compared with tape guide rolls, friction between them and the tape is greatly increased, as a result of which reel torque is influenced to a considerable extent. Each guide pin which has a cylindrical shoulder at its base is integral with the bottom of the cartridge and engages a hole in a shoulder of similar shape on the top wall; these shoulders serve to guide the magnetic tape in the vertical direction.

An object of the present invention is to provide a tape guide element which reliably guides the magnetic tape despite the latter's slight lateral rigidity, particularly at high tape transport speeds, as it joins or leaves the pack, and lessens the torque required to drive the reels.

This object is achieved by a tape guide element which has at least one guide surface for the tape and is arranged near the periphery of the pack at maximum pack diameter.

At only slight additional expense each winding is freshly oriented on the pack during winding of the tape, resulting in a stable and accurate pack. Jamming of the tape as a result of it slipping from the pack, the formation of loops and other operational disturbances are prevented by the tape guide element of the invention, even when extremely thin tapes are employed.

The novel tape guide element advantageously has an approximately C shape when viewed from the side and one or more guide surfaces which in the direction of tape motion have a greater effective length than width. Both horizontal and vertical guidance of the tape is thus improved. The guide surface should preferably end in the immediate vicinity of the periphery of the pack at maximum pack diameter. This feature in conjunction with the elongated rectangular guide surface ensures reliable guidance of the tape before it joins the pack so that the winding operation is improved.

In a particularly advantageous embodiment of the invention a guide element having a guide surface is arranged on either side of the tape, the guide elements being arranged in such a way that at large pack diameters the magnetic tape is in contact with one guide element and at small pack diameters the tape is in contact with the other element. This arrangement takes into account the pack diameter prevailing at any one time so that tape guidance is improved even further.

Figure 2:
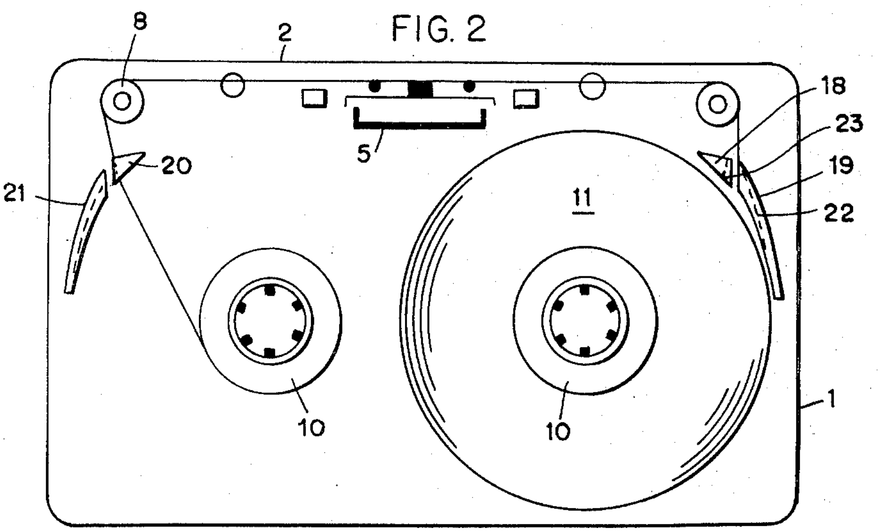
Figure 3:
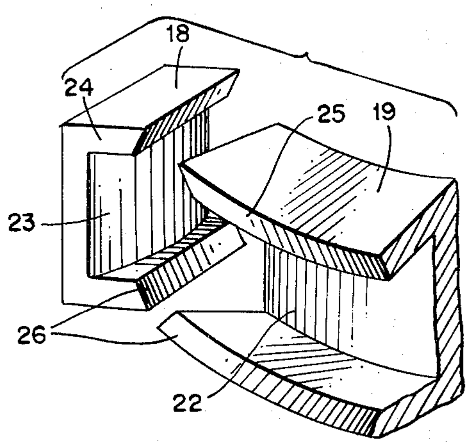
Figure 4:
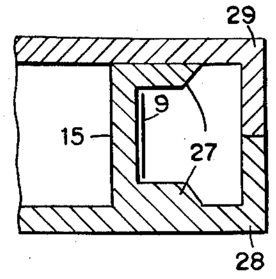
Figure 5:
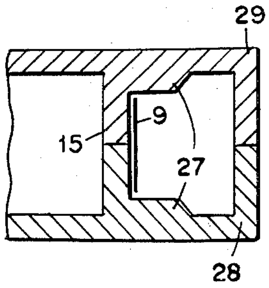
Figure 7:
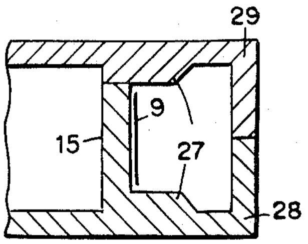
Figure 6:
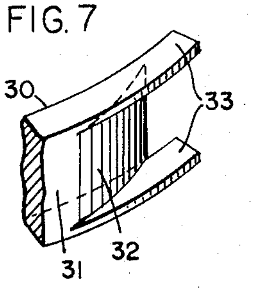

The invention is described in detail below with reference to the accompanying drawings, in which FIG. 1 is a diagrammatic plan view of a magnetic tape cartridge with tape guide elements according to the invention, FIG. 2 is a diagrammatic plan view of a magnetic tape cartridge with tape guide elements on either side of the tape, FIG. 3 is a perspective view of another embodiment of a pair of tape guide elements according to the invention, FIGS. 4 to 6 are cross-sectional views of three embodiments of the tape guide element shown in FIG. 1, and FIG. 7 is a perspective sectional view of a further guide element according to the invention.

An approximately rectangular cartridge 1 has in the front side wall 2 openings (not shown) serving to admit the magnetic heads and pressure rolls. Openings 3 and 4 are provided for the admission of the capstan and tape guide pins on the recorder (not shown). A magnetic head screening shield 5, a resilient pressure pad 6 and tape guide pins 7 are arranged between openings 3 and 4. Idler rolls 8 are rotatably mounted near the corners of the cartridge adjacent to front wall 2. A magnetic tape 9 which runs parallel to front wall 2 around idler rolls 8 is fastened to rotatably mounted flangeless spools 10. Tape 9 is wound on the right-hand flangeless spool to form a pack 11, the circumference of this pack being at its largest, whereas there are only a few windings of tape on the left-hand flangeless spool. A guide element 15 is attached to the cartridge housing at a slight distance from the periphery of pack 11 between side wall 12 and pack 11. A further guide element 13 is arranged symmetrically with respect to the central transverse axis 14 on the other side of the cartridge for the pack to be wound on the left-hand flangeless spool 10. Guide elements 13 and 15 have rectangular guide surfaces 16 and 17 respectively (indicated by dashed lines) around which the turn of tape approaching or leaving the pack is guided and with which the tape is constantly in contact when it is in motion. As can be clearly seen from the drawing, guide elements 13 and 15 are situated between the left-hand flangeless spool 10 and magnetic tape 9 and between pack 11 and magnetic tape 9 respectively. Guide elements 13 and 15 are furthermore arranged approximately at a tangent to the periphery of the pack at maximum pack diameter, and guide surfaces 16 and 17 end immediately before the said periphery. The same parts have been given the same reference numerals in all drawings. In the cartridge 1 shown in FIG. 2 two pairs of guide elements 18 and 19 and 20 and 21 are arranged on either side of the tape. FIG. 3 is a partial perspective view of a pair of guide elements 18 and 19. Elements 19 and 21 have guide surfaces 22 which face flangeless spools 10, whereas elements 18 and 20 have guide surfaces 23 which face side walls 12. It can be seen from FIG. 2, which shows a momentary position of the magnetic tape 9, that the outer surface of the tape is in contact with guide surface 22 of element 19 and the inner surface is in contact with guide surface 23 of element 18. Guide surfaces 22 and 23 are bounded by flanges 25 and 24 respectively. Surfaces 22 and 23 as well as surfaces 16 and 17 are slightly curved in the direction of tape motion so that the tape is not subjected to undue stress. Bevels 26 facilitate the passage of the tape from one element to the other. The dimensions of guide elements 13 and 15 and 18 to 21 are matched to the spatial conditions inside the cartridge housing. FIGS. 4 to 6 show in section part of the cartridge 1 with guide element 15. FIG. 4 shows how the vertical web and guide flanges 27 can be molded integrally with bottom part 28, the upper guide flange abutting against the top wall of the upper part 29 of the cartridge. An advantageous embodiment is shown in FIG. 5. The vertical web is split in the middle, each half and a guide flange 27 being molded integrally with the bottom part 28 and the top part 29, identical cartridge halves thus being obtained which can be manufactured economically, for example, by injection molding. FIG. 6 shows a further advantageous embodiment in which the vertical web and lower flange 27 are molded integrally with bottom part 28 and upper flange 27 is integral with top part 29. In the embodiments shown in FIGS. 5 and 6 a gap may be present at the joint without the guiding properties of the guide surfaces suffering to any great extent.

The guide element 30 shown in FIG. 7 has a guide surface 31 with an area 32 which is curved toward the pack 11 shown in FIG. 1, and guide flanges 33 which extend beyond the end of guide surface 31. In a preferred embodiment flanges 33 end in the immediate vicinity of the periphery of the pack at maximum pack diameter, as a result of which vertical guidance of the tape is also achieved between guide surface 31 and pack 11. The curvature of area 32 can be matched to the ratio between minimum and maximum pack diameters, thus ensuring that friction between the magnetic tape and the guide element, particularly at small pack diameters, is as low as possible.

Guide elements 13, 18 to 21 and 30 can of course be molded integrally with the cartridge in the same way as guide element 15.

It is of course also possible to attach guide elements 13, 15, 18 to 21 and 30 to one or both parts of the cartridge housing in any other suitable manner, for example by welding or with the aid of adhesives.

We claim:

1. In a magnetic tape cassette including a housing having two parts, a pair of tape-supporting flangeless spools rotatable to unwind tape off a pack on one spool and wind tape onto a pack on the other spool, and guide members around which said tape passes in the form of a loop between the packs, the improvement that said guide members comprise:

re-directing guide means located adjacent the front of the cassette, and at least one fixed guide element extending in the plane of rotation of the corresponding pack and along the side thereof between said pack and one of said guide means, and close to the periphery of said pack when said pack is of substantially full diameter, said guide element having a guide face which is perpendicular to said plane of rotation and substantially flat lengthwise of the turn of tape approaching or leaving the pack and which provides direct surface contact between the face and said turn of tape over a substantial length of said face, having adjacent that end of the guide face at which said turn of tape merges with the full diameter pack, a marginal portion which is at least as close to the full diameter pack as said face so that said turn of tape is guided smoothly with respect to said pack at said marginal portion, and having guide flanges extending above and below said turn of tape.

2. In a magnetic tape cassette the improvement as claimed in claim 1, wherein the guide face of the guide element in the direction of tape motion has a greater effective length than width.

3. In a magnetic tape cassette the improvement as claimed in claim 1 wherein said guide flanges extend along said guide face beyond the end thereof.

4. In a magnetic tape cassette the improvement as claimed in claim 1, wherein the guide element is formed integrally with at least one of the two parts of the housing by molding.

5. In a magnetic tape cassette the improvement as claimed in claim 4, wherein said guide element has two cooperating portions, one being molded integrally with the bottom part of the housing and the other portion being molded integrally with the top part of the housing.

6. In a magnetic tape cassette including a housing having two parts, a pair of tape-supporting flangeless spools rotatable to unwind tape off a pack on one spool and wind tape onto a pack on the other spool, and guide members around which said tape passes in the form of a loop between the packs, the improvement that said guide members comprise at least one fixed guide element having a guide surface on either side of the tape, said guide element being designed in such a way that at large pack diameters the magnetic tape is in contact with one guide surface and at small pack diameters with the other guide surface.

* * * * *

UNITED STATES PATENT AND TRADEMARK OFFICE

CERTIFICATE OF CORRECTION

PATENT NO. : 3,831,882
DATED : August 27, 1974
INVENTOR(S) : Horst Fitterer and Norbert Schaeffer It is certified that error appears in the above-identified patent and that said Letters Patent are hereby corrected as shown below:

Column 1, in the heading, insert--[30] Foreign Application Priority Data, December 14, 1971, Germany, and G 71 46 948.2--;

Column 1, in the heading, insert--[73] Assignee: Badische Anilin- & Soda-Fabrik Aktiengesellschaft, Ludwigshafen/Rhein, Germany--.

Signed and Sealed this
sixteenth Day of December 1975

[SEAL]

Attest:

RUTH C. MASON
*Attesting Officer*

C. MARSHALL DANN
*Commissioner of Patents and Trademarks*